April 3, 1962    J. J. REED    3,027,700
LEAKPROOF VALVE
Filed June 9, 1960
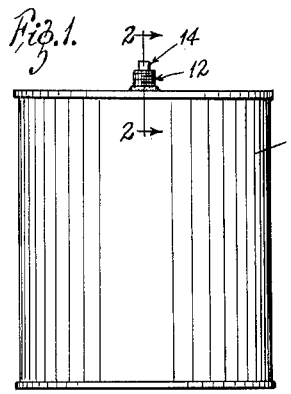
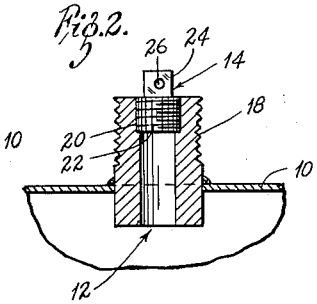
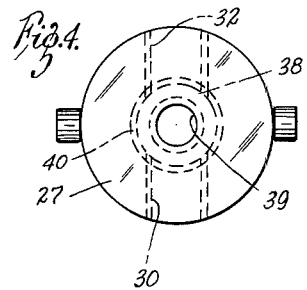
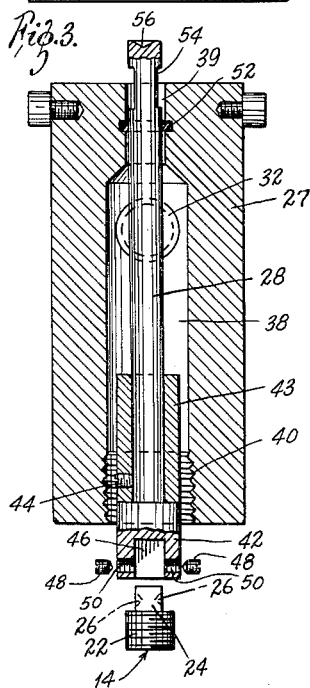
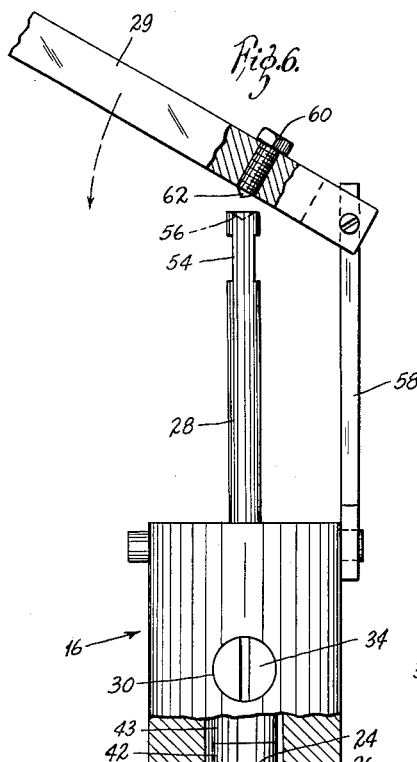
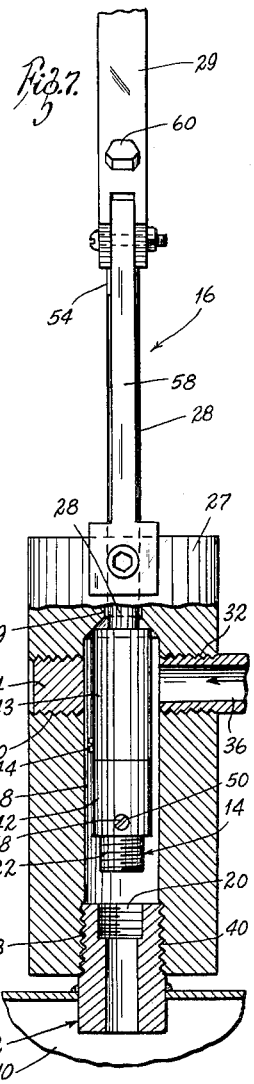
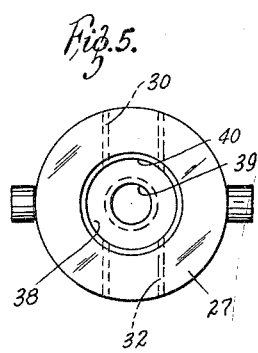
INVENTOR:
JOHN J. REED,
BY Kingsland, Rogers & Ezell
ATTORNEYS

United States Patent Office 3,027,700
Patented Apr. 3, 1962

3,027,700
LEAKPROOF VALVE
John J. Reed, Flat River, Mo., assignor to St. Joseph Lead Company, New York, N.Y., a corporation of New York
Filed June 9, 1960, Ser. No. 35,083
3 Claims. (Cl. 53—266)

This invention relates to improvements in leakproof valves, and, in particular, is concerned with a valve and adapter device for charging fluids to containers under high pressure.

The device of this invention makes it possible to charge fluid under high pressure to conventional containers, which need be modified only by providing an externally and internally threaded adapter plug. The valve device of this invention takes the form of a casing which may be threaded on the top of the container valve plug in such a manner that fluid may be passed under pressure through the casing with the provision of a valve plug, which may be operated within the casing under pressure to cap the valve coupling through the operation of a handle driving a piston which may be rotated to thread the plug within the coupling.

As a result, low cost permanent sealing of a vessel or system while holding the system under high fluid pressure is made possible. A special feature of the valve is that the only expandable parts are the simple threaded coupling plus an ordinary pipe plug. As soon as the closure is made, the casing and valving components may be removed and used again for another operation.

The valve is especially effective in sealing systems filled with grout, or other thick heavy slurries, containing varying amounts of solids. This type of slurry tends to partially block ordinary valve seats and thereby permit small leaks. In contrast to permitting a small leak, which would immediately result in a pressure drop within the system to be sealed, the valve of this invention actually raises the pressure within the system during closure, because the pipe plug being threaded in the coupling when the system is under pressure actually acts as a small powerful piston.

Another feature and object of this invention is the provision of a double inlet port in the valve casing. One of these is plugged during the filling of the system, as with grout or other heavy slurries. The other is used for the introduction of the fluid under high pressure. As soon as the closure of the valve is complete, the plugged inlet port is opened so that the valve body can then be flushed with clear water without breaking any other connections.

Other features of this invention will be apparent from the detailed description which follows, and will be otherwise obvious to those skilled in the art.

For the purpose of illustration, there is shown in the accompanying drawings a preferred embodiment of this invention. It is to be understood that these drawings are for the purpose of example only and that the invention is not limited thereto.

In the drawings:

FIGURE 1 is a view in elevation of a conventional drum equipped with the coupling and pipe plug after being filled with fluid under pressure;

FIGURE 2 is an enlarged view in section on the line 2—2 of FIGURE 1 showing the structure of the coupling and the pipe plug;

FIGURE 3 is a view mainly in vertical section through the axis of the valve casing, but showing the valve stem in partially full body view;

FIGURE 4 is a top plan view of the valve casing;

FIGURE 5 is a bottom plan view of the valve casing;

FIGURE 6 is a view partly in side elevation and partly in section through the valve casing showing the operation of the valve operating handle and valve stem; and FIGURE 7 is a view similar to FIGURE 6, but in front elevation.

This invention makes use of two simple expendable components and the valve operating device which may be used over and over again. The expendable components are shown in FIGURE 1 attached to a container 10. They include a coupling 12 and a capped pipe plug 14. These components are more fully shown in FIGURE 2 and FIGURES 6 and 7 where they are shown in the process of securing the pipe plug to the coupling by the use of the valve operating device 16, which is generally indicated by this reference numeral.

As shown in FIGURES 2, 6 and 7, the coupling device 12 may be secured to the container 10 by welding or the like. The coupling device is externally threaded at 18 to receive the valve operating device and internally threaded at 20 to receive the pipe plug. The pipe plug is of conventional construction having threads 22 and a square-shaped cap 24. In addition, it is provided with detent recesses 26 so that it may be secured within an operating valve stem and the valve operating device as will more fully appear hereinbelow.

The valve operating device 16 is best shown in FIGURES 3, 6 and 7. It includes as its main component a casing or housing 27, a valve operating stem 28, and a handle 29.

The casing 27 is provided with two ports as best shown in FIGURE 7, the ports being designated 30 and 32. The port 30 is adapted to be closed by a wash plug 34 and is sealed off during the actual plug closing operation. The port 32 is provided with a threaded nipple 36, which may be attached to a pump for pumping fluid under pressure through the casing and into the container.

The casing is further provided with a bore hole 38 and a reduced diameter valve stem guide hole 39. The bore hole is threaded at 40 at the bottom so that the casing may be threaded upon the coupling threads 18 in the manner shown in FIGURES 6 and 7.

The valve operating stem 28 is provided at its bottom with a forged socket 42. A spacer collar 43 is adapted to be secured to the valve stem 26 by the setscrew 44. The socket 42 is also provided with a square-shaped cavity 46 which receives the cap 24 of the pipe plug. Setscrews 48 may be threaded through threaded holes 50 to engage the detent 26 of the cap of the pipe plug to hold the pipe plug in place in the socket.

The upper portion of the valve operating stem 26 is sealed with respect to the casing by an O-ring 52. A flat portion is also provided at 54 near the upper portion of the valve operating stem 28 in order that a wrench may be placed upon the stem to rotate it in order to screw the pipe plug into the coupling as will further appear. The top of the valve operating stem is provided with a conical detent 56 for engagement with the handle as will further appear.

The handle 29 is pivotally connected to a fulcrum support 58 as shown in FIGURES 6 and 7. The handle is further provided with a bearing bolt 60 which may be adjusted by providing different size bolts as will be obvious. This bearing bolt has a pointed end 62 which engages the conical detent 56 on the top of the valve operating stem so that it may be pressed downwardly under pressure.

Use

The valve operating device of this invention may be very simply used with standard containers and the like. The container is first tapped and then the coupling 12 is fitted into it and secured by welding or the like as shown in FIGURES 2, 6 and 7. Once this has been done the valve device 16 is fitted with the pipe plug. This may be done by extending the valve stem downwardly in the position shown in FIGURE 3. The pipe plug is then inserted in the cavity 46 so that the cap is nested into said cavity. Then the setscrews 48 are threaded into the bore holes 50 to engage the cap detents 26 to hold the pipe plug securely in place.

Once this has been done the valve operating stem is retracted to the position shown in FIGURES 6 and 7 and the casing is threaded upon the top of the coupling. The device is then ready for use with the wash plug 34 in plugged position and with a source of fluid connected to the inlet nipple 36. The source of high pressure fluid is not shown but it will be understood that it may be connected to a pump for pumping slurry, grout, or the like.

Once the source of fluid has been connected and the container filled, the valve operating handle 29 is moved downwardly in the direction of the arrow shown in FIGURE 6. The bearing bolt 60 will then contact the top of the valve stem to move the bottom of the pipe plug into engagement with the top of the internally threaded portion 20 of the coupling. When this initial engagement is effected, the valve operating stem is then rotated by connecting a wrench to the flat portion 54 of the valve operating stem. The valve operating stem is then continued to be rotated while pressure is maintained upon the valve operating handle 29 until the pipe plug is securely connected to the coupling. This completes the connecting operation.

It will be seen that by the operation described above fluid may be charged under pressure through the inlet nipple 36 and the container may be filled under high pressure. The connecting operation whereby the plug is connected to the coupling is effected while high pressure is still maintained upon the system and the movement of the plug acts as a piston. After the plug has been connected, the source of high fluid pressure can be cut off and wash water can be sent through the nipple 36 with the wash plug 34 being disconnected. This will flush out the interior of the casing and will clean it for further use. The casing and valve operating device can then be very simply withdrawn by merely unscrewing the casing from the coupling and then unscrewing the setscrews to withdraw the valve operating device as a unit.

It will be apparent that by this invention there has been provided a valve operating device that can charge heavy fluids containing suspended solids and the like under pressure to a container in such a manner that it can be filled and closed while maintaining a high fluid pressure. As a matter of fact, in the closing operation the valve operating stem with the attached pipe plug acts as a piston so that in the closing operation the pressure is maintained with no loss and is even slightly increased. The valve operating device is very simply attached and removed in the above described operation and there are no close tolerances whereby gritty solids can disturb the relationship of cooperating parts to present the danger of leaks and the like.

Various change and modifications may be made within the spirit of this invention as will be readily apparent to those skilled in the art. Such changes and modifications are within the scope and teaching of this invention as defined by the claims appended hereto.

What is claimed is:

1. A device for charging fluid to a container under pressure and sealing said container under pressure, said container comprising a tubular coupling connected to said container, and a cap plug adapted to be screwed into said coupling to seal the container, said device comprising a valve operating attachment, said valve operating attachment comprising a housing adapted to be secured to said coupling and provided with an inlet for charging fluid under pressure to the housing and said coupling and a valve operating stem having means for holding the cap plug, said valve operating stem having an upper and extending through the top of said housing and being relatively movable in sealed relation with said housing, said valve stem being rotatable to screw said cap plug into the coupling while the fluid pressure is maintained, and a wash port in said housing provided with a removable plug whereby the housing may be flushed with water after the container is closed by charging water through said inlet port.

2. A device for charging fluid to a container under pressure and sealing said container under pressure, said container comprising a tubular coupling connected to said container, and a cap plug adapted to be screwed into said coupling to seal the container, said device comprising a valve operating attachment, said valve operating attachment comprising a housing adapted to be secured to said coupling and provided with an inlet for charging fluid under pressure to the housing and said coupling and a valve operating stem having means for holding the cap plug, said means comprising an elongated socket releasably engaging the cap of said plug and having a substantially close fit with a bore hole provided in said housing to provide a piston-like action, said valve operating stem having an upper end extending through the top of said housing and being relatively movable in sealed relation with said housing, said valve stem being rotatable to screw said cap plug into the coupling while the fluid pressure is maintained, means for applying pressure upon the end of said stem to force the cap plug upon the top of the coupling while it is being screwed into said coupling, and a wash port in said housing provided with a removable plug whereby the housing may be flushed with water after the container is closed by charging water through said inlet port.

3. A device for charging fluid to a container under pressure and sealing said container under pressure, said container comprising a tubular coupling connected to said container, and a cap plug adapted to be screwed into said coupling to seal the container, said device comprising a valve operating attachment, said valve operating attachment comprising a housing adapted to be secured to said coupling and provided with an inlet for charging fluid under pressure to the housing and said coupling and a valve operating stem having means for holding the cap plug, said means comprising a socket releasably engaging the cap of said plug, said valve operating stem being extensible to expose said socket at the bottom of the housing whereby the cap plug may be engaged and disengaged and said valve operating stem being further provided with an upper end extending through the top of said housing and being relatively movable in sealed relation with said housing, said valve stem being rotatable to screw said cap plug into the coupling while the fluid pressure is maintained and means for applying pressure upon the end of said stem to force the cap plug upon the top of the coupling while it is being screwed into said coupling, said last named means comprising a handle pivotally supported from a fulcrum support on the top of said housing and having a portion cooperating with the top of said stem, and a wash port in said housing provided with a removable plug whereby the housing may be flushed with water after the container is closed by charging water through said inlet port.

References Cited in the file of this patent

UNITED STATES PATENTS

| | | |
|---|---|---|
| 173,093 | Wells | Feb. 1, 1876 |
| 2,032,862 | Wilkins | Mar. 3, 1936 |
| 2,202,569 | Armstrong | May 28, 1940 |
| 2,457,867 | Chambers | Jan. 4, 1949 |
| 2,698,120 | Fairchild | Dec. 28, 1954 |
| 2,761,603 | Fairchild | Sept. 4, 1956 |